United States Patent [19]

Kelsey

[11] Patent Number: 5,142,006
[45] Date of Patent: Aug. 25, 1992

[54] POLYMERIZATION OF CYCLIC OLEFINS

[75] Inventor: Donald R. Kelsey, Fulshear, Tex.

[73] Assignee: Shell Oil Company, Houston, Tex.

[21] Appl. No.: 471,455

[22] Filed: Jan. 29, 1990

[51] Int. Cl.$^5$ .................. C08F 4/78; C08F 136/00
[52] U.S. Cl. ................... 526/142; 526/283; 502/172; 502/228
[58] Field of Search .......... 502/103, 109, 172; 526/132, 134

[56] References Cited

U.S. PATENT DOCUMENTS

| | | | |
|---|---|---|---|
| 4,357,477 | 11/1982 | Knifton | 568/678 |
| 4,400,340 | 8/1983 | Klosiewicz | 264/328.6 |
| 4,550,216 | 10/1985 | Basset et al. | 585/645 |
| 4,716,138 | 12/1987 | Murray | 502/117 |
| 4,729,976 | 3/1988 | Sjardijn et al. | 502/102 |
| 4,835,230 | 5/1989 | Khasat et al. | 526/221 |
| 4,861,848 | 8/1989 | Basset et al. | 526/169 |
| 4,935,394 | 6/1990 | Chang | 502/104 |

OTHER PUBLICATIONS

Beshouri et al., "Electrochemical Behavior of Tungsten(VI) Aryloxides and Catecholates,"*Inorganic Chemistry* 25, p. 1962 (1986).

*Primary Examiner*—Joseph L. Schofer
*Assistant Examiner*—Wu C. Cheng

[57] ABSTRACT

A catalyst and process for the polymerization of cyclic olefins, such as dicyclopentadiene, are disclosed. The catalyst comprises the reaction product of a transition metal halide and a biphenol. Polymerization can be carried out in a reaction injection molding process to prepare a thermoset molded article.

13 Claims, No Drawings

POLYMERIZATION OF CYCLIC OLEFINS

BACKGROUND OF THE INVENTION

This invention relates to the polymerization of cyclic olefins. In one embodiment, the invention relates to a catalyst for the reaction injection molding of dicyclopentadiene.

Cyclic olefins are subject to ring-opening metathesis polymerization to produce thermoset polymers having physical properties which make them suitable for structural and electronic applications, such as molded car parts and electrical laminates. Such polymerizations are commonly carried out in reaction injection molding (RIM) processes, in which a metathesis catalyst and a monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. It has been found in molding polydicyclopentadiene, for example, that the presence of unreacted monomers results in a molded part having a very unpleasant odor and less than optimum physical properties. In commercial RIM processes, it is economically desirable that the process be carried out in as short a cycle time as possible and at mold temperatures at or near room temperature. It is also advantageous to be able to use an impure monomer stream and thus avoid extensive purification of the monomer prior to polymerization.

One metathesis catalyst system which has been successfully used in RIM processes is the combination of a phenol-treated transition metal salt, such as $WOCl_4$ or $WCl_6$, and a co-catalyst such as an aluminum or tin compound. In particular, a phenol-substituted tungsten compound combined with a tin hydride, as described in U.S. Pat. No. 4,729,976, has been found highly efficient for monomer incorporation into the polymer. This catalyst also is highly active in a relatively impure dicyclopentadiene feed stream.

The use of the aluminum and tin co-catalysts, however, has certain drawbacks. Both co-catalysts require special handling because of toxicity concerns and sensitivity to air and moisture. In addition, tin co-catalysts are quite expensive. It would therefore be desirable to provide a catalyst for the polymerization of cyclic olefins which has sufficient activity that cocatalysts are required in relatively low amounts.

It is therefore an object of this invention to provide a catalyst and process for the polymerization of cyclic olefins. In one embodiment, it is an object of the invention to provide a catalyst which is highly active for the polymerization of dicyclopentadiene. In a further embodiment, it is an object of the invention to provide a reaction injection molding process.

BRIEF DESCRIPTION OF THE INVENTION

According to the invention, a process and catalyst for the polymerization of cyclic olefins are provided, wherein a cyclic olefin is polymerized in the presence of a catalyst composition comprising the reaction product of a transition metal compound and a biphenol. In a specific embodiment, the invention process involves the use of a catalyst composition comprising the reaction product of a tungsten halide or oxyhalide and a biphenol, and optionally a borohydride or tin hydride co-catalyst for the reaction injection molding of dicyclopentadiene. The invention catalyst and process enable the rapid polymerization of dicyclopentadiene at relatively low mold temperatures or relatively low levels of the catalyst.

DETAILED DESCRIPTION OF THE INVENTION

The Catalyst

The polymerization catalyst includes a transition metal compound. The transition metal is preferably, because of the high activity of the resulting catalyst for dicyclopentadiene polymerization, a metal of Group VB or VIB such as molybdenum, tungsten or tantalum. The transition metal compound (or starting material therefor) is generally in the form of a salt, including such salts as halides, including oxyhalides. Suitable halides include chloride, bromide and fluoride. The transition metal halide is preferably one in which the halide is present in a molar amount of at least three atoms per atom of transition metal. Examples of such transition metal halides include molybdenum oxytetrachloride, molybdenum oxytrichloride, molybdenum trioxyhexachloride, molybdenum trioxypentachloride, molybdenum oxytetrafluoride, tungsten hexachloride, tungsten oxytetrachloride, and tungsten oxytetrabromide. The preferred transition metal compounds, because of their high activity for dicyclopentadiene polymerization, are tungsten hexachloride, tungsten oxytetrachloride, molybdenum oxytrichloride, and mixtures thereof. The transition metal compound will generally be present in the polymerization reaction mixture in an amount of from about 0.001 to about 0.5, preferably from about 0.002 to about 0.2, most preferably from about 0.01 to about 0.1 mole percent, based on moles of cyclic olefin monomer present.

The transition metal compound includes the reaction product of the above transition metal salt with a biphenol for solubilization and enhanced activity of the transition metal salt. The biphenol can be represented by the general formula

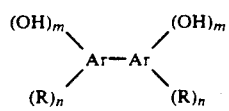

in which each Ar represents an aromatic ring-containing moiety having at least one hydroxyl group attached to an aromatic ring; each R is independently selected from $C_{1-12}$ alkyl, aryl, halide, mono-, di-or trihalo methyl, cyano and alkoxy; each n is independently 0–4; and each m is independently 1–4. Suitable biphenols include 2,2'-biphenol, 4,4'-biphenol, 1,1'-bi-2-naphthol, tetra-tertiary-amyl-2,2'-biphenol, tetra-tertiary-amyl-4,4'-biphenol, tetra-tertiary-butyl-2,2'-biphenol, tetra-tertiary-butyl-4,4'-biphenol, 2,2'-dihydroxyfluorene, and 4,4'-dihydroxyfluorene.

The biphenol will generally be present in the catalyst in an amount of about 0.1 to about 3 moles per mole of the transition metal, preferably from about 0.4 to about 1.5 moles, most preferably about 0.4 to about 1.0. The reaction product can be prepared, for example, by contacting, under an oxygen-free inert atmosphere, the biphenol compound and the transition metal compound in an inert organic liquid with mild heat and removal of generated hydrogen halide. Suitable inert organic liquids for the reaction include, for example, cyclopentane, cyclohexane, benzene, toluene, xylene, chlorobenzene and dichlorobenzene. The inert organic liquid is then preferably distilled off under vaccum, and the residue is dissolved in dry, degassed cyclic olefin monomer or other suitable solvent such as toluene.

CO-CATALYSTS

The catalyst composition may optionally include one or more co-catalysts such as a borohydride co-catalyst, including those compounds which can be represented by the formula $[Y+][BH_mZ_n]^-$, in which $Y+$ represents an organic or organometallic cationic counterion, Z is a substituent group such as alkyl, cyano, halide and the like, $m>0$ and $m+n=4$. Particularly preferred are borohydrides represented by the formula $[R_3P]_2[M+]BH_4^-$, in which each R is independently selected from $C_{1-20}$, preferably $C_{2-12}$, hydrocarbyl, preferably aryl. Examples of such borohydrides include transition metal-based borohydrides such as bis(triphenylphosphine) copper(I) borohydride and ammonium borohydrides such as bis(triphenylphosphoranylidene)ammonium borohydride. Effectiveness of the borohydride depends to some extent on its solubility in the monomer to be polymerized, and difficultly-soluble borohydrides such as sodium triethyl borohydride, sodium borohydride and tetrabutyl ammonium borohydride are in general not active co-catalysts in non-polar cyclic olefins such as dicyclopentadiene. Preferred co-catalysts, because of their activity in dicyclopentadiene, are those represented by the above formula in which $m=4$, $n=0$ and $Y+$ includes aromatic groups such as triarylphosphine and tetraaryldiphosphine, such as 1,2-bis(diphenylphosphine)ethane, moieties.

Suitable co-catalysts can also include, for example, an organo aluminum compound, including trialkyl aluminum, alkylaluminum dihalides, dialkylaluminum halides, or alkyl(alkyloxy) aluminum halides, or an organo tin hydride compound, the latter including compounds which can be represented by the formula $Sn(R)_3H$, in which each R is selected independently from hydrogen, substituted or unsubstituted aryl, or $C_{1-20}$ alkyl. Specific examples of such co-catalysts include ethyl aluminum chloride, diethyl aluminum chloride, trioctyl aluminum, tributyl tin hydride, tripentyl tin hydride, diphenyl tin dihydride, trioctyl tin hydride, methyldicyclohexyl tin hydride, cyclopentyldimethyl tin hydride, triphenyl tin hydride and phenyldimethyl tin hydride. Substituents on the R groups in the above formula can include, for example, $C_{1-20}$ alkoxy and halides.

The co-catalyst will be present in the catalyst composition in an amount effective to enhance the activity of the catalyst, which will vary depending upon the specific components present and the reaction conditions. In general, a tin-containing co-catalyst will be present in a molar amount of from about 15:1 to about 1:1, preferably from about 8:1 to about 2:1, based on moles of transition metal in the catalyst. An organo aluminum halide will generally be present in a molar ratio of about 8:1 to about 1:1. A borohydride co-catalyst will generally be present in an amount within the range of about 0.5 to about 20 or more, preferably about 1 to about 10, moles per mole of the transition metal compound.

The catalyst system may include a moderator to delay the initiation of polymerization if the selected catalyst and co-catalyst cause instant polymerization upon contact. Ethers, esters, ketones, nitriles and polar cyclic olefins are among suitable moderators for catalyst systems made up of tungsten catalyst and alkyl aluminum halide co-catalysts. Ethyl benzoate, butyl ether bis(2-methoxyethyl)ether and polar cyclic olefins are preferred moderators. Moderators are generally not necessary for catalyst systems having a tin hydride or borohydride co-catalyst.

The invention catalyst can further optionally include a boron halide promoter, including boron trihalides, boron trihalide complexes and tetrahaloborates. The boron promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and the borohydride, and amounts of boron halide above the optimum may inhibit polymerization. The presently-preferred boron halides, because of their high activity and stability, are boron trifluoride and its ethyl ether and butyl ether complexes.

CATALYST PREPARATION

The preferred catalyst composition of the invention includes a biphenol-substituted tungsten chloride or oxychloride catalyst and an optional trialkyl tin hydride co-catalyst. This catalyst has been found to exhibit high activity in the polymerization of dicyclopentadiene.

The above catalyst composition is preferably prepared by reacting about one mole of a biphenol with two moles of tungsten hexachloride or tungsten oxytetrachloride, or mixture thereof, in dry inert solvent such as toluene at a temperature within the range of about 25° to about 95° C., preferably about 40° to about 75° C., under oxygen-free argon. Hydrogen chloride by-product is swept out of the reaction and the toluene is distilled off under vacuum. The reaction product is preferably stored neat at room temperature or dissolved in an inert organic solvent such as toluene. Any cocatalyst is generally combined with the transition metal catalyst in the reaction mixture as a solution of the monomer to be polymerized. The boron halide promoter, if used, is generally combined with the transition metal and/or co-catalyst solution.

POLYMERIZATION

The polymerization process of the invention involves contacting one or more cyclic olefin monomers with the catalyst composition. Suitable cyclic olefin monomers and comonomers include those of the norbornene type which can be represented by the structural formulas

in which each R is selected independently from hydrogen, $C_{1-20}$ alkyl, $C_{1-20}$ alkenyl, aryl and, with R groups linked together through carbon atoms, saturated and unsaturated cyclic hydrocarbon groups. Included in such monomers and comonomers are dicyclopentadiene, norbornene, norbornadiene, 5-(2-propenyl)norbornene and the like. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a tin hydride or borohydride co-catalyst permits the use of lower purity, technical-grade (83–95%) dicyclopentadiene monomer. An advantage of the invention catalyst is that it is very active in relatively impure (90–95%) dicyclopentadiene.

The invention polymerization process is preferably carried out by reaction injection molding (RIM), in which a solution of the catalyst, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1, most preferably about 1000:1 to about 5000:1.

In a preferred RIM polymerization technique, a stream of the transition metal catalyst component in the monomer to be polymerized and a monomer stream containing any co-catalyst employed are combined in the mixing head of a RIM machine just prior to injection of the combined stream into a mold. The boron halide promoter, if used, is injected into the mixing head with the transition metal stream, with the co-catalyst stream, or in a separate monomer solution stream.

The initial mold temperature will generally be within the range of about 20° to about 130° C., preferably about 35° to about 100° C. The mold pressure is generally within the range of about 10 to about 50 psi. After injection of the catalyst and monomer into the mold, there is an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

THE POLYMER

The invention RIM process prepares a crosslinked dicyclopentadiene homopolymer or copolymer. The presently preferred polydicyclopentadiene product is a crosslinked polymer containing at least about 90 percent dicyclopentadiene monomer units. The polymer will typically have a flexural strength of at least about 5000 psi, preferably greater than about 6000 psi, and a Tg of at least about 100° C. (DSC at 20° C./min). The polymer is useful in applications such as structural composites, for example, in the automobile industry, and in electrical applications such as printed circuit boards.

EXAMPLE 1

Polymerization with Tungsten Catalysts

Certain specific embodiments of the invention are described in which dicyclopentadiene or norbornylene was polymerized under laboratory-scale reaction injection molding conditions using a catalyst according to the invention. The biphenol-substituted tungsten catalysts used in the experimental runs were prepared by reacting tungsten oxytetrachloride or tungsten hexachloride with the indicated amount of a biphenol in dry toluene (or chlorobenzene) at 25°–90° C. under oxygen-free, dry argon and, after the hydrogen chloride by-product had been swept from the reaction, distilling the toluene under vacuum. Described procedures were carried out in a nitrogen dry box or under purified argon atmosphere.

A series of polymerizations of a norbornene-type monomer were made using various biphenol-treated transition metal catalysts. The conditions and results of the experiments are shown in Table 2. The polymerizations, except as noted in the tables, followed one of two procedures. In one, a 30-mL dried serum bottle with a stir bar under nitrogen atmosphere was charged with the biphenol-treated transition metal catalyst, in powder or toluene solution, the $BF_3$ complex, if used, and about 15 g of monomer. To this solution was added by syringe a monomer solution of tin hydride such that the final solution had about 16 g of monomer. In an alternate method, bis(triphenylphosphine) copper borohydride, $BF_3$ complex, if used, and 15–16 g monomer were combined in the serum bottle, and a monomer or toluene solution of the transition metal catalyst was added by syringe such that the final solution contained about 16 g monomer. In both procedures, the contents of the bottle were stirred for about 30 seconds. The bottle, containing a thermocouple, was then transferred to an oil bath at 90° C. Table 1 shows the compositions of the catalysts used. Table 2 shows polymerization conditions, time to onset of substantial polymerization of the reaction mass, the internal temperature of the reaction mass at onset, maximum exotherm temperature, and time for the polymerization reaction mass to reach maximum exotherm for the catalysts under a variety of non-optimized reaction conditions.

TABLE 1

Catalysts

| Catalyst | Transition metal (mmol) | Biphenol (mmol) | Other (mmol) | Comments |
|---|---|---|---|---|
| 1 | WOCl₄ (2.50) | 2,2'-biphenol (1.25) | | A |
| 1A | WOCl₄ (10.0) | 2,2'-biphenol (5.0) | | B |
| 1B | WOCl₄ (10.0) | 2,2'-biphenol (5.0) | | B |
| 1C | WOCl₄ (2.50) | 2,2'-biphenol (2.72) | | C,M |
| 1D | WOCl₄ (2.50) | 2,2'-biphenol (2.72) | | D |
| 1E | WOCl₄ (2.50) | 2,2'-biphenol (2.75) | | E |
| 1F | WOCl₄ (2.50) | 2,2'-biphenol (2.55) | | B |
| 1G | WOCl₄ (2.50) | 2,2'-biphenol (2.52) | | A |
| 2 | WCl₆ (2.50) | 2,2'-biphenol (1.25) | | B |
| 3 | WOCl₄ (2.50) | tetra-t-amyl-2,2'-biphenol (1.10) | | F |
| 3A | WOCl₄ (2.50) | tetra-t-amyl-2,2'-biphenol (2.20) | | F |
| 4 | WCl₆ (2.50) | tetra-t-amyl-2,2'-biphenol (1.10) | | F |
| 5 | WOCl₄ (2.50) | tetra-t-butyl-2,2'-biphenol (1.25) | | F |
| 5A | WOCl₄ (5.0) | tetra-t-butyl-2,2'-biphenol (2.50) | | F,G |
| 5B | WOCl₄ (10.0) | tetra-t-butyl-2,2'-biphenol (5.0) | | E |
| 5C | WOCl₄ (15.0) | tetra-t-butyl-2,2'-biphenol (7.50) | | |
| 6 | WCl₆ (5.0) | tetra-t-butyl-2,2'-biphenol (2.50) | | F,G |
| 7 | WOCl₄ (5.0) | tetra-t-butyl-4,4'-biphenol (3.08) | | |
| 7A | WOCl₄ (15.0) | tetra-t-butyl-4,4'-biphenol (7.50) | | |
| 8 | WCl₆ (5.0) | tetra-t-butyl-4,4'-biphenol (2.50) | | |
| 9 | WOCl₄ (2.50) | 2,2'-biphenol (2.50) | 2,6-di-t-butyl-4-methylphenol (2.50) | H |
| 9A | WOCl₄ (4.0) | 2,2'-biphenol (2.5) | 2,6-di-t-butyl-4-methylphenol (8.0) | H |
| 45 | MoCl₃ (2.50) | 2,2'-biphenol (1.25) | | |
| Control 10 | WOCl₄ | | 2,6-diisopropylphenol | J |
| Control 10A | WOCl₄ (2.50) | | 2,6-diisopropylphenol (2.70) | K |
| Control 10B | WOCl₄ (5.00) | | 2,6-diisopropylphenol (5.00) | L |
| Control 11 | WOCl₄ (5.00) | | 2,2'-methylenebis(4-methyl-6-t-butylphenol) (2.50) | |
| Control 11A | WOCl₄ (2.50) | | 2,2'-methylenebis(4-methyl-6-t-butylphenol) (2.50) | |
| Control 12 | WOCl₄ (5.00) | | t-butylcatechol (2.50) | |
| Control 13 | WOCl₄ (5.00) | | 2,5-di-t-butyl-1,4-hydroquinone (2.50) | |
| Control 14 | WOCl₄ (5.00) | | 2,3,5,6-tetrafluoro-1,4-hydroquinone (2.50) | |

Comments
A Biphenol as 3% solution in chlorobenzene, dried over molecular sieves, reaction in chlorobenzene
B Biphenol as 2% solution in toluene, dried over molecular sieves; reaction in toluene.
C Nominally, 9.9% biphenol in toluene, actual biphenol reacted was <2 mmol
D Nominally, 9.9% biphenol in toluene, actual biphenol reacted was <0.8 mmol
E Biphenol solution (2.12%) dried by azotropic distillation of toluene
F Biphenol as 20% solution in toluene, dried over molecular sieves
F Some air may have leaked into reaction flask during distillation of toluene
H Phenol was reacted first, then the biphenol, in toluene
J 2:1 mole ratio of phenol/W
K Technical grade (99%) diisopropylphenol
L Reagent grade (99%) diisopropylphenol
M Polymerized when attempting to make solution in DCPD

TABLE 2

Polymerization of Dicyclopentadiene

| Example | Catalyst/ mequiv$^a$ | BF₃.But₂O (mmoles) | Cocatalyst$^b$ (mmoles) | Onset Time, min | Onset Temp, °C | Exotherm Temp, min | Exotherm Temp, °C | Comments |
|---|---|---|---|---|---|---|---|---|
| 15 | 1 | 0.121 | | 4.5 | 85 | 4.9 | 191 | K |
| 15A | | 0.242 | | NE | | | | A,H |
| 15B | | 0.059 | | 0.247B | 2.5 | 82 | 3.5 | 208 | K |
| 15C | | 0.121 | | 2.0 | 69 | 8.0 | 101 | J,K |
| 15D | | 0.059 | | 0.026T | 1.5 | 38 | 10.3 | 129 | J,K,Q |
| 15E | | 0.121 | | NR | | | | K |
| 15F | | 0.040 | 0.010 | 0.156T | 0.6 | 50 | 1.1 | 169 | A,K,M |
| 15G | | 0.030 | | 0.118T | ND | ND | 15.0 | 98 | D,J,K |
| 15H | | 0.058 | | 0.059T | ND | ND | 7.0 | 133 | J |
| 15I | | 0.068 | | 0.236T | ND | ND | 6.0 | 100 | A,J,K,M |
| 15J | | 0.121 | | NR | | | | K |
| 15K | | 0.121 | | NE | | | | A,H |
| 16 | 1A | 0.060 | 0.059 | 0.059T | 3.3 | 75 | 6.2 | 153 | K,J |
| 16A | | 0.040 | 0.010 | 0.156T | 0.6 | 39 | 1.2 | 189 | |
| 16B | | 0.060 | 0.059 | 0.088T | NE | | | | A,H,K |
| 16C | | 0.060 | | 0.059T | NE | | | | A,G,H,K |
| 16D | | 0.060 | | 0.059T | 2.4 | 48 | 5.2 | 133 | H,K |
| 16E | | 0.060 | 0.059 | 0.059T | NE | | | | A,H,K |
| 16F | | 0.060 | | 0.118T | 0.8 | 53 | 2.0 | 180 | K |
| 16G | | 0.121 | | | 15.4 | 108 | 16.4 | 199 | K |
| 16H | | 0.060 | 0.059 | 0.029T | NE | | | | D,K |
| 16I | | 0.060 | | 0.236T | 0.5 | 52 | 1.8 | 169 | K |
| 17 | 1B | 0.121 | | NE | | | | C |
| 17A | | 0.060 | | 0.236T | 3.6 | 41 | 6.2 | 179 | M |
| 17B | | 0.053 | | NE | | | | G |
| 17C | | 0.028 | | 0.109T | Immediate | <0.6 | >178 | | B,D,T |
| 17D | | 0.060 | | 0.236T | NE | | | | A |
| 18 | 1C | | | | | | | | R,S |

TABLE 2-continued

Polymerization of Dicyclopentadiene

| Example | Catalyst/ mequiv[a] | BF$_3$.But$_2$O (mmoles) | Cocatalyst[b] (mmoles) | Onset Time, min | Onset Temp, °C. | Exotherm Temp, min | Exotherm Temp, °C. | Comments |
|---|---|---|---|---|---|---|---|---|
| 19 | 1D 0.096 | | | 10.4 | 95 | 10.9 | 191 | K |
| 19A | 0.048 | | | NE | | | | K |
| 19B | 0.048 | 0.006 | | NE | | | | K |
| 20 | 1E 0.119 | | | NE | | | | A,H |
| 20A | 0.059 | | | NR | | | | K |
| 20B | 0.118 | | | NE | | | | C,K |
| 20C | 0.119 | 0.030 | | NE | | | | A,H |
| 20D | 0.059 | | 0.220T | NE | | | | G |
| 20E | 0.059 | | | NE | | | | A,H |
| 20F | 0.118 | | | NR | | | | K |
| 21 | 1F 0.121 | | | NR | | | | K |
| 21A | 0.121 | | | NR | | | | K |
| 21B | 0.059 | | 0.236T | NR | | | | K |
| 21C | 0.059 | | 0.236B | NR | | | | K |
| 22 | 1G 0.040 | 0.010 | 0.156T | 3.8 | 84 | 7.3 | 100 | D,H |
| 22A | 0.059 | | 0.222T | NR | | | | H |
| 22B | 0.059 | 0.059 | 0.472T | 0.9 | 78 | 1.3 | 174 | |
| 22C | 0.059 | | 0.236B | NE | | | | C,K |
| 22D | 0.119 | | | NR | | | | |
| 23 | 2 0.040 | | 0.156T | ND | ND | 4.6 | 129 | J |
| 23A | 0.059 | | 0.236T | ND | ND | 15.6 | 107 | D,J |
| 23B | 0.060 | | 0.059T | ND | ND | 8.9 | 176 | J |
| 23C | 0.040 | 0.010 | 0.156T | ND | | | | E |
| 23D | 0.121 | | | 9.0 | 99 | 10.0 | 229 | K,P |
| 23E | 0.121 | | | 18.0 | 115 | 20.0 | 200 | K |
| 23F | 0.060 | | 0.236T | Immediate | | 0.6 | 198 | F |
| 23G | 0.029 | 0.004 | 0.118T | Immediate | | 0.5 | 165 | F |
| 23H | 0.040 | 0.010 | 0.156T | Immediate | | 0.4 | 185 | F |
| 23I | 0.059 | | 0.236B | 6.7 | 85 | 9.5 | 158 | K |
| 24 | 3 0.059 | | 0.059T | NE | | | | A,K |
| 24A | 0.097 | | | NR | | | | K |
| 24B | 0.020 | 0.005 | 0.080T | 0.6 | 45 | 1.3 | 200 | F,K |
| 24C | 0.059 | 0.030 | 0.236B | ND | ND | 6.8 | 108 | J,K |
| 24D | 0.020 | | 0.080T | ND | ND | 9.9 | 108 | J,K |
| 24E | 0.059 | | 0.236B | 1.8 | 70 | 4.7 | 179 | K |
| 24F | 0.055 | | 0.236T | NE | | | | A,K |
| 24G | 0.059 | | 0.236T | ND | ND | 9.0 | 100 | A,F,K,Q |
| 24H | 0.036 | | 0.156T | 1.8 | 80 | 5.6 | 105 | A,K |
| 24I | 0.041 | | 0.156T | ND | ND | 10.0 | 98 | A,F,K,Q |
| 24J | 0.036 | 0.010 | 0.156T | NE | | | | A,K |
| 24K | 0.030 | | 0.121T | Immediate | | 1.2 | 191 | F,K |
| 24L | 0.097 | | | NR | | | | K,P |
| 24M | 0.059 | | 0.236T | NE | | | | D,K |
| 25 | 3A 0.039 | 0.010 | 0.156T | Immediate | | 0.5 | 201 | F,K |
| 25A | 0.059 | | 0.236B | 2.5 | 85 | 5.0 | 185 | K |
| 25B | 0.059 | | 0.236T | Immediate | | 0.7 | 197 | K |
| 25C | 0.039 | | 0.156T | 4.4 | 61 | 6.1 | 200 | K |
| 25D | 0.059 | | 0.236B | ND | ND | 6.4 | 173 | J,K |
| 25E | 0.121 | | | NR | | | | K |
| 26 | 4 0.030 | 0.008 | 0.121T | 1.0 | 46 | 1.8 | 209 | |
| 26A | 0.039 | | 0.156T | 1.5 | ND | 2.8 | ND | E |
| 26B | 0.059 | | 0.236B | 3.2 | 81 | 8.5 | 116 | K |
| 26C | 0.122 | | | NR | | | | |
| 26D | 0.059 | | 0.236T | Immediate | | 0.8 | 192 | |
| 26E | 0.035 | | 0.156T | 2.0 | 57 | 3.0 | 211 | |
| 27 | 5 0.039 | 0.010 | 0.039T | NE | | | | A,K |
| 27A | 0.059 | | 0.236T | ND | ND | 12 | 111 | D,F,J,K,Q |
| 27B | 0.059 | | 0.236B | 2.1 | 76 | 3.1 | 188 | K |
| 27C | 0.039 | | 0.058T | ND | ND | 8.5 | 95 | A,K |
| 27E | 0.039 | | 0.019T | NE | | | | A,K |
| 27F | 0.121 | | | NR | | | | K |
| 27G | 0.059 | 0.059 | 0.059T | NE | | | | A,K |
| 27H | 5 0.039 | | 0.039T | NE | | | | A,K |
| 27I | 0.039 | | 0.078T | ND | ND | 0.4 | 109 | A,F,J,K |
| 27J | 0.059 | 0.059 | 0.071T | NE | | | | A,K,E |
| 27K | 0.059 | 0.059 | 0.059T | NE | | | | A,K,E |
| 27L | 0.059 | 0.059 | 0.030T | NE | | | | A,K |
| 28A | 5A 0.059 | | 0.236B | 2.1 | 90 | 2.7 | 206 | K |
| 28B | 0.118 | | | NR | | | | |
| 28C | 0.059 | | 0.220T | 0.2 | 36 | 0.7 | 183 | |
| 28D | 0.039 | 0.010 | 0.156T | 0.5 | 35 | 1.4 | 179 | |
| 29 | 5B 0.039 | | 0.078T | ND | ND | 5.5 | 144 | F,J |
| 29A | 0.039 | | 0.039T | ND | ND | 10.6 | 97 | F |
| 29B | 0.039 | | 0.058T | 3.4 | 43 | 10.1 | 116 | F |
| 29C | 0.059 | | 0.038B | 2.1 | 65 | 3.4 | 192 | |
| 29D | 0.118 | | | NR | | | | |
| 29E | 0.039 | 0.010 | 0.156T | Immediate | | 0.2 | >192 | F,B |
| 29F | 0.059 | | 0.220T | Immediate | | 0.4 | >157 | F,B |
| 29G | 0.029 | | 0.121T | ND | ND | 9.6 | 148 | F,J |

TABLE 2-continued

Polymerization of Dicyclopentadiene

| Example | Catalyst/ mequiv[a] | BF$_3$.But$_2$O (mmoles) | Cocatalyst[b] (mmoles) | Onset Time, min | Onset Temp. °C. | Exotherm Temp. min | Exotherm Temp. °C. | Comments |
|---|---|---|---|---|---|---|---|---|
| 29H | | 0.035 | 0.140T | | Immediate | 2.2 | 190 | F |
| 29I | | 0.048 | 0.192T | | Immediate | 0.4 | 200 | F,B |
| 29J | | 0.039 | 0.156T | | Immediate | 2.1 | 197 | F |
| 29K | | 0.029 | 0.008 | 0.121T | Immediate | 0.9 | 197 | F,B |
| 29L | | 0.027 | 0.109T | | Immediate | <0.4 | >173 | B,F,T |
| 30 | 5C | 0.059 | 0.236T | | Immediate | 0.9 | 184 | |
| 30A | | 0.029 | 0.073 | 0.118T | 1.8 | 39 | 3.2 | 191 | R |
| 30B | | 0.039 | 0.156T | 2.0 | 54 | 4.4 | 190 | R |
| 30C | | 0.039 | 0.156T | 0.9 | 51 | 2.1 | 173 | |
| 30D | | 0.029 | 0.073 | 0.118T | 1.1 | 50 | 2.1 | 199 | |
| 31 | 6 | 0.039 | 0.010 | 0.156T | 0.50 | 39 | 0.8 | 152 | A |
| 30A | | 0.039 | 0.010 | 0.156T | ND | ND | 3.4 | 95 | B,F,G,J |
| 30B | | 0.059 | 0.236B | 3.7 | 96 | 6.0 | 149 | K |
| 30C | | 0.039 | 0.236B | 5.0 | 93 | 5.7 | 202 | K |
| 30D | 6 | 0.118 | NR | | | | | |
| 30E | | 0.058 | 0.220T | 2.3 | 92 | 3.8 | 99 | G |
| 31 | 7 | 0.039 | 0.010 | 0.156T | 1.3 | — | 2.0 | — | E |
| 31A | | 0.039 | 0.010 | 0.156T | 0.5 | 59 | 0.8 | 191 | |
| 31B | | 0.059 | 0.236B | 7.7 | 102 | 8.5 | 146 | K |
| 31C | | 0.059 | 0.236B | 3.8 | 106 | 4.5 | 210 | K |
| 31D | | 0.059 | 0.220T | 3.0 | 64 | 3.6 | 192 | |
| 31E | | 0.118 | NR | | | | | |
| 32 | 7A | 0.118 | NE | | | | | A |
| 32A | | 0.059 | 0.236T | NE | | | | D |
| 32B | | 0.059 | 0.236T | NE | | | | A |
| 32C | | 0.118 | NE | | | | | A |
| 33 | 8 | 0.039 | 0.020 | 0.049T | 13.4 | 98 | 18.2 | 144 | |
| 33A | | 0.039 | 0.020 | 0.077T | 0.9 | 55 | 1.2 | 178 | |
| 33B | | 0.058 | 0.236B | 8.2 | 92 | 12.1 | 148 | K |
| 33C | | 0.039 | 0.039 | 0.039T | NE | | | | G |
| 33D | | 0.039 | 0.020 | 0.019T | NR | | | | |
| 33E | | 0.039 | 0.020 | 0.039T | 2.0 | 77 | 14.0 | 132 | J |
| 33F | | 0.039 | 0.022 | 0.058T | 5.6 | 66 | 7.3 | 193 | |
| 33G | | 0.050 | 0.464T | 8.9 | 79 | 10.5 | 116 | D,J |
| 33H | | 0.039 | 0.010 | 0.156T | | Immediate | 0.3 | 214 | F |
| 33I | | 0.039 | 0.020 | 0.068T | 3.4 | 39 | 4.8 | 202 | |
| 33J | | 0.033 | 0.220T | 1.8 | 67 | 2.4 | 160 | |
| 33K | | 0.067 | NE | | | | | C |
| 34 | 9 | 0.121 | 0.059 | NR | | | | | K |
| 34A | | 0.121 | NR | | | | | K |
| 34B | | 0.039 | 0.010 | 0.156T | 4.6 | 61 | 5.6 | 166 | F,K |
| 34C | | 0.059 | 0.236T | 6.3 | 90 | 7.7 | 207 | K |
| 35 | 9A | 0.059 | 0.220T | 4.8 | 55 | 5.6 | 210 | K |
| 35A | | 0.333 | NE | | | | | C |
| 35B | | 0.059 | 0.118T | 5.5 | 108 | 6.3 | 170 | K |
| 35C | 9A | 0.059 | 0.030 | 0.220T | 0.6 | 48 | 1.3 | 173 | K |
| 35D | | 0.316 | NE | | | | | C |
| 35E | | 0.060 | 0.030 | 0.220T | 1.1 | 45 | 1.7 | 190 | K |
| 35F | | 0.059 | 0.030 | 0.220T | 0.9 | 38 | 1.9 | 183 | |
| 36 | 10 | 0.059 | 0.220T | 3.6 | 53 | 5.1 | 203 | |
| 36A | | 0.039 | 0.156T | 4.4 | 63 | 5.8 | 209 | |
| 36B | | 0.020 | 0.020 | 0.080T | 3.0 | 41 | 4.4 | 177 | |
| 36C | | 0.059 | 0.232B | 10.1 | 105 | 11.3 | 201 | |
| 37 | 10A | 0.039 | 0.010 | 0.156T | 1.4 | 47 | 2.4 | 100 | E,J |
| 37A | | 0.059 | 0.220T | <3.4 | <86 | 4.1 | 141 | J |
| 37B | | 0.059 | 0.236B | 6.9 | 82 | 8.1 | 192 | K |
| 37C | | 0.118 | NR | | | | | |
| 38 | 10B | 0.059 | 0.029 | 0.088T | 0.3 | 62 | 0.8 | 201 | K |
| 38A | | 0.059 | 0.236B | 3.1 | 60 | 3.9 | 191 | K,L |
| 38B | | 0.060 | 0.220T | 0.3 | 67 | 0.8 | 169 | E,K |
| 38C | | 0.040 | 0.012 | 0.156T | 0.1 | 52 | 0.3 | 187 | K |
| 38D | | 0.119 | NR | | | | | K |
| 38E | | 0.059 | 0.030 | 0.059T | 2.2 | 45 | 7.0 | 126 | G,K |
| 39 | 11 | 0.118 | NR | | | | | H |
| 39A | | 0.059 | 0.236T | ND | ND | 20.7 | 125 | H,J |
| 40 | 11A | 0.059 | 0.236T | NE | | | | D |
| 40A | | 0.121 | NR | | | | | |
| 40B | | 0.059 | 0.030 | 0.236T | 1.7 | 50 | 2.5 | 212 | |
| 41 | 12 | 0.059 | 0.236B | NE | | | | G,K |
| 41A | | 0.118 | NE | | | | | G,K |
| 41B | | 0.061 | 0.220T | NE | | | | G,K |
| 41C | | 0.039 | 0.010 | 0.156T | 3.7 | 57 | 6.1 | 169 | K |
| 41D | | 0.039 | 0.010 | 0.156T | | | | | E,G,H |
| 41E | | 0.059 | 0.220T | | | | | E,G,H |
| 41F | | 0.118 | NR | | | | | E,G,H |
| 41G | | 0.059 | 0.236B | | | | | E,G,K |
| 42 | 13 | 0.059 | 0.220T | 6.2 | 94 | 7.3 | 183 | |
| 42A | | 0.118 | NE | | | | | C |
| 42B | | 0.039 | 0.010 | 0.156T | | | | | A,G,E |

TABLE 2-continued

Polymerization of Dicyclopentadiene

| Example | Catalyst/ mequiv[a] | BF₃.Bu₂O (mmoles) | Cocatalyst[b] (mmoles) | Onset Time, min | Onset Temp, °C. | Exotherm Temp, min | Exotherm Temp, °C. | Comments |
|---|---|---|---|---|---|---|---|---|
| 42C |    | 0.038 | 0.010 | 0.156T | 3.2 | 93 | 3.9 | 196 |    |
| 42D |    | 0.059 |       | 0.236B | NE |    |     |     | G,K |
| 43  | 14 | 0.059 |       | 0.236B | 1.4 | 66 | 21.9 | 107 | K |
| 43A |    | 0.038 | 0.010 | 0.156T | 3.3 | 65 | 4.4 | 189 | H |
| 43B |    | 0.119 |       |        | ND |    |     |     | A,G,E |
| 43C |    | 0.058 |       | 0.220T | 2.6 | 47 | 4.1 | 188 | H |
| 44  | 45 | 0.058 |       | 0.236T | NR |    |     |     |    |
| 44A |    | 0.122 |       |        | NR |    |     |     |    |
| 44B |    | 0.058 | 0.059 | 0.236T | NE |    |     |     | G,U |
| 44C |    | 0.087 | 0.088 | 0.354T | NE |    |     |     | G,V |

[a]Milli-equivalents of W or Mo. [b]Cocatalysts: T = tributyltin hydride; B = bis(triphenylphosphine)copper(I) borohydride Comments
A: Localized polymerization (clumps)
B: Reacted before thermocouple inserted
C: Thickened
D: Hard solid or gel
E: Thermocouple or data collection system malfunction
F: Immediate reaction
G: Gelled
H: Some undissolved catalyst; poor mixing
J: Unusual exotherm profile; onset values undetermined or uncertain
K: Catalyst dissolved in toluene
L: Some undissolved borohydride
M: Catalyst/monomer stirred overnight at 23° C.
N: Started data collection (time) 1 min before injection of cocatalyst
P: Stirred 70 min before heating in 90° C. oil bath
Q: Half of DCPD added with cocatalyst
R: Reagent concentrations uncertain
S: Exothermic polymerization of DCPD when attempted to make master solution of catalyst; no cocatalyst present.
T: Polymerization of 5 g norbornylene (85%) in toluene, 0.14 g DCPD added with cocatalyst
U: Bath at 90° C. for 30 min, then raised to 120° C. for 60 min.
V: Bath at 120° C.
NE: No exotherm
NR: No reaction
ND: Not determined

I claim:

1. A composition comprising (a) the product of reacting a tungsten halide and a biphenol compound of general formula

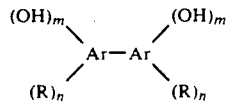

in which Ar represents an aromatic ring-containing moiety; each R is independently selected from $C_{1-12}$ alkyl, aryl, halide, methyl halide, cyano and alkoxy; each m is independently selected from 1–4; and each n is independently selected from 0–4; and (b) a triorgano tin hydride.

2. The composition of claim 1 in which Ar is selected from benzene and naphthalene.

3. The composition of claim 1 in which the biphenolic compound is selected from 2,2'-biphenol, 4,4'-biphenol and 1,1'-bi-2-naphthol.

4. The composition of claim 3 in which the transition metal halide is selected from the group consisting of tungsten hexachloride, tungsten oxytetrachloride, and mixtures thereof.

5. The composition of claim 1 in which further comprises a cyclic olefin.

6. The composition of claim 1 in which the biphenolic compound is present in an amount within the range of about 0.1 to about 3 moles per mole of the transition metal halide.

7. The composition of claim 1 which further comprises from about 0.5 to about 20 moles, per mole of the transition metal halide, of a borohydride.

8. The composition of claim 1 which further comprises from about 0.01 to about 10 moles, per mole of the transition metal halide, of a boron halide.

9. The composition of claim 1 in which the organo tin hydride comprises from about 1 to about 10 moles, per mole of the tungsten halide, of an organo tin hydride of the formula $R_3SnH$, in which each R is selected from aryl and $C_{1-20}$ alkyl.

10. The composition of claim 6 in which the transition metal halide is tungsten oxytetrachloride and the biphenolic compound is biphenol.

11. The composition of claim 10 which further comprises from about 0.5 to about 20 moles, per mole of the tungsten oxytetrachloride, of bis(triphenylphosphine)-copper(I)borohydride.

12. The composition of claim 10 in which the organo tin hydride comprises from about 1 to about 10 moles of tributyl tin hydride per mole of the tungsten oxytetrachloride.

13. The composition of claim 10 which further comprises dicyclopentadiene.

* * * * *